United States Patent
Skjegstad et al.

(10) Patent No.: US 10,111,114 B2
(45) Date of Patent: Oct. 23, 2018

(54) CHANNEL SELECTION IN UNLICENSED BANDS USING PEER-TO-PEER COMMUNICATION VIA THE BACKHAUL NETWORK

(71) Applicant: Forsvarets Forskningsinstitutt, Kjeller (NO)

(72) Inventors: Magnus Skjegstad, Stabekk (NO); Torleiv Maseng, Oslo (NO)

(73) Assignee: Maseng AS, Oslo (NO)

( * ) Notice: Subject to any disclaimer, the term of this patent is extended or adjusted under 35 U.S.C. 154(b) by 132 days.

(21) Appl. No.: 15/200,701

(22) Filed: Jul. 1, 2016

(65) Prior Publication Data
US 2018/0007568 A1    Jan. 4, 2018

(51) Int. Cl.
| | | |
|---|---|---|
| H04W 24/02 | (2009.01) | |
| H04W 16/14 | (2009.01) | |
| H04W 4/08 | (2009.01) | |
| H04W 8/00 | (2009.01) | |
| H04W 4/02 | (2018.01) | |
| H04W 76/14 | (2018.01) | |

(52) U.S. Cl.
CPC ............ *H04W 24/02* (2013.01); *H04W 4/02* (2013.01); *H04W 4/08* (2013.01); *H04W 8/005* (2013.01); *H04W 16/14* (2013.01); *H04W 76/14* (2018.02)

(58) Field of Classification Search
CPC ....... H04W 24/02; H04W 76/14; H04W 4/02; H04W 16/14; H04W 4/08; H04W 8/005
See application file for complete search history.

(56) References Cited

U.S. PATENT DOCUMENTS

| | | |
|---|---|---|
| 7,986,660 B2 | 7/2011 | Ramos et al. |
| 8,059,593 B2 | 11/2011 | Shih et al. |
| 8,923,225 B2 | 12/2014 | Sydor et al. |
| 8,982,907 B2 | 3/2015 | Skjegstad et al. |
| 9,066,251 B2 | 6/2015 | Madan et al. |
| 9,131,391 B2 | 9/2015 | Madan et al. |

(Continued)

FOREIGN PATENT DOCUMENTS

| | | |
|---|---|---|
| CN | 104066188 A | 9/2014 |
| WO | 2013/066314 A1 | 5/2013 |

(Continued)

OTHER PUBLICATIONS

Surachai Chieochan et al.; "Channel Assignment Schemes for Infrastructure-Based 802.11 WLANs: A Survey"; IEEE Communications Surveys & Tutorials; vol. 12, No. 1; pp. 124-136; First Quarter 2010 (13 pages).

Janne Riihijärvi et al.; "Performance Evaluation of Automatic Channel Assignment Mechanism for IEEE 802.11 Based on Graph Colouring"; The 17th Annual IEEE International Symposium on Personal, Indoor and Mobile Radio Communications (PIMRC'06); Sep. 2006 (5 pages).

(Continued)

*Primary Examiner* — Thai Nguyen
(74) *Attorney, Agent, or Firm* — Osha Liang LLP

(57) ABSTRACT

A system for wireless communication devices using a frequency band shared by other devices, which performs channel and power allocation without operator intervention or a shared coordination device, in which all devices in a local area called a group, perform the same channel and power allocation using their own local data about their network and that of their group, which is shared along with data from the other devices in the group, using the backhaul network to exchange information with other devices in the group for providing better radio communication performance for the members of the group.

17 Claims, 4 Drawing Sheets

(56) References Cited

U.S. PATENT DOCUMENTS

| | | | |
|---|---|---|---|
| 9,258,768 B2 | 2/2016 | Jung et al. | |
| 2006/0072602 A1 | 4/2006 | Achanta | |
| 2010/0091731 A1 | 4/2010 | Kim et al. | |
| 2012/0014289 A1* | 1/2012 | Ortega | H04W 52/04 370/255 |
| 2012/0026941 A1* | 2/2012 | Ahmad | H04W 48/16 370/328 |
| 2013/0036236 A1* | 2/2013 | Morales | H04L 67/104 709/238 |
| 2013/0201891 A1* | 8/2013 | Rodriguez | H04W 40/005 370/311 |
| 2013/0272285 A1 | 10/2013 | Goldsmith et al. | |
| 2014/0313890 A1 | 10/2014 | Shrote et al. | |
| 2015/0100619 A1 | 4/2015 | Flores Miranda et al. | |
| 2017/0026468 A1* | 1/2017 | Kumar | H04L 67/1095 |

FOREIGN PATENT DOCUMENTS

| | | |
|---|---|---|
| WO | 2013/152305 A1 | 10/2013 |
| WO | 2014/025822 A2 | 2/2014 |

OTHER PUBLICATIONS

Arunesh Mishra et al.; "Weighted Coloring based Channel Assignment for WLANs"; ACM SIGMOBILE Mobile Computing; 2005 (12 pages).

Fatemeh Rahimian et al.; "Vitis: A Gossip-based Hybrid Overlay for Internet-scale Publish/Subscribe: Enabling Rendezvous Routing in Unstructured Overlay Networks"; 2011 IEEE International Parallel & Distributed Processing Symposium (IPDPS); pp. 746-757; May 2011 (12 pages).

Márk Jelasity et al.; "T-Man: Gossip-based Overlay Topology Management"; Engineering Self-Organising Systems, in Lecture Notes in Computer Science; Eds. Springer Berlin Heidelberg; vol. 3910; pp. 1-15; 2006 (15 pages).

Magnus Skjegstad et al.; "Large-Scale Distributed Internet-based Discovery Mechanism for Dynamic Spectrum Allocation"; Proceedings of IEEE DySPAN 2014 (13 pages).

* cited by examiner

CHANNEL SELECTION IN UNLICENSED BANDS USING PEER-TO-PEER COMMUNICATION VIA THE BACKHAUL NETWORK

INTRODUCTION

The present invention relates to setup of radio devices connected through a communication network. More specifically the invention relates to a method and system for optimal allocation of channel and power of radio devices.

BACKGROUND AND PRIOR ART

A network of radio devices connected to the Internet, including mobile systems, Wi-Fi terminals and Internet of Things sensors may comprise thousands to millions of connection points or devices distributed over large areas, even countries. With this vast amount of different radios, it is essential to be able to coordinate radio traffic by selecting suitable radio channel etc. Possible solutions range from fully centralized controlled allocation to fully distributed solutions without any centralized control.

Wi-Fi networks are installed in 25% of homes all around the world. 40% of these are located in cities where people live in multi-dwelling-units where interference between networks is a big problem. It is unknown to many that their Wi-Fi network can work significantly better by simply changing their operating channel thereby minimizing mutual interference between the networks. When doing this, the channel with the least interference is normally chosen.

The most popular ISM band (Industrial, Scientific and Medical), where unlicensed operations are permitted, is at 2.4 GHz having only 3 non-overlapping channels. Selecting the channel with the least interference is known as a local optimization of the network. A significantly better solution is to include other networks in an assessment, known as global optimization of the network. Several methods for doing this have been proposed.

The most common method is to solve this by creating a conflict graph. Finding a solution to this is however hard, because a complete overview of all neighbouring Wi-Fi networks within an interference range is needed. In the following, Wi-Fi networks within an interference range are called a group. In mobile networks, this overview is available and channel selection is a result of careful radio planning, considering the best location of the base stations, antennas etc.

The following is a list of publications describing different problems and solution related to channel and power allocation of wireless network devices.

U.S. Pat. No. 7,986,660 B2; Channel allocation for communication system.
US 20100091731 A1; Channel allocation method and apparatus for wireless communication networks.
WO 2013152305 A1; Interference management and network performance optimization in dense Wi-Fi networks.
WO 2014025822 A2; Dynamic channel selection algorithms for interference management in Wi-Fi networks.
U.S. Pat. No. 9,131,391 B2; Dynamic channel selection algorithms for interference management in WIFI networks.
US 20150100619 A1; Dual channel Wi-Fi for congested WLANs with asymmetric traffic loads.
U.S. Pat. No. 8,982,907 B2; Large-scale peer-to-peer discovery mechanism for frequency allocation.
U.S. Pat. No. 8,923,225 B2; Cognitive Wi-Fi radio network.
US 20140313890 A1; Profiling Wi-Fi channel congestion and interference to optimize channel selection.
CN 104066188 A; K-screening neighbour channel allocation method based on node degree.
WO 2013066314 A1; Profiling Wi-Fi channel congestion and interference to optimize channel selection.
US 20130272285 A1; Interference management and network performance optimization in dense Wi-Fi networks.
U.S. Pat. No. 8,059,593 B2; Distributed channel allocation method and wireless mesh network therewith.
U.S. Pat. No. 9,066,251 B2; Global and local optimization of Wi-Fi access points.
US 20060072602 A1; Method and apparatus for least congested channel scan for wireless access points.
U.S. Pat. No. 9,258,768 B2; Method for using legacy Wi-Fi and Wi-Fi P2P simultaneously.
US 20060072602 A1; Method and apparatus for least congested channel scan for wireless access points;
U.S. Pat. No. 9,258,768 B2; Method for using legacy Wi-Fi and Wi-Fi P2P simultaneously;
US 20100091731 A1; Channel allocation method and apparatus for wireless communication networks;
Surachai Chieochan, Ekram Hossain, and Jeffrey Diamond: "Channel Assignment Schemes for Infrastructure-Based 802.11 WLANs: A Survey", IEEE Communications Surveys and Tutorials, Vol. 12, No. 1, First Quarter 2010.
J. Riihijarvi, M. Petrova, and P. Mahonen, J. A. Barbosa, "Performance Evaluation of Automatic Channel Assignment Mechanism for IEEE 802.11 Based on Graph Coloring," in Proc. 17th Annual IEEE International Symposium on Personal, Indoor and Mobile Radio Communications, pp. 1-5, September 2006.
Arunesh Mishra, Suman Banerjee, William Arbaugh: "Weighted Coloring based Channel Assignment for WLANs" ACM SIGMOBILE Mobile Computing, 2005
F. Rahimian, S. Girdzijauskas, A. H. Payberah, and S. Haridi, "Vitis: A Gossip-based Hybrid Overlay for Internet-scale Publish/Subscribe," in Proc. of the 25rd IEEE International Symposium on Parallel & Distributed Processing (IPDPS'11). IEEE, May 2011, pp. 746-757.
M. Jelasity and O. Babaoglu, "T-man: Gossip-based overlay topology management," in Engineering Self-Organising Systems, ser. Lecture Notes in Computer Science, S. Brueckner, G. Marzo Serugendo, D. Hales, and F. Zambonelli, Eds. Springer Berlin Heidelberg, 2006, vol. 3910, pp. 1-15.
Magnus Skjegstad, Brage Ellingsæter, Torleiv Maseng, Jon Crowcroft and Øyvind Kure, "Large-Scale Distributed Internet-based Discovery Mechanism for Dynamic Spectrum Allocation", 2014, IEEE DySPAN 2014.

Wi-Fi access points are usually installed in private homes at a convenient place with omnidirectional antennas, and in an uncoordinated manner, resulting in competition with other neighbouring radios for resources in the ISM frequency band. It is common to include clients such as laptops, pads, mobiles connected by radio to Wi-Fi access points in the channel assignment, but this should be done in a joint network manner and not as an isolated task within the local radio network.

Known solutions for avoiding conflicts in Wi-Fi networks is letting one access point acts as a master and coordinator, but not in a peer-to-peer (P2P) fashion over the backhaul network as is the case in the current invention.

Using a radio channel as a control channel is well known. A better way is however to use the backhaul network, since the capacity for handling control messages is large, and communications is possible even if the radio channel is unavailable.

Internet Service Providers normally change the IP address of all of their private customers every month. This is done for giving their customers anonymity. In order to ensure that the relation between the location of the devices and their IP address provided by the peer-to-peer protocol can be acquired by a third party, each device may select a partner device randomly. This selection can work asynchronously among the devices. A device can also be selected to represent several devices and must announce its current capacity for running a software agent on behalf of other devices at random locations. The IP address of the access point can not be inferred by IP address of the other devices.

The assignment of a radio spectrum of today's radio communication systems is too static and thus an obstacle when introducing new systems into the radio spectrum.

There is a need for new ways of spectrum sharing based on a dynamic scalable distribution system capable of handling millions of small networks.

The present invention is intended to open the spectrum gridlock and give an innovative and potential advantage. The solution may release initiatives to modernize spectrum regulation and create business opportunities.

The invention will further improve the wireless Internet experience by reducing interference thereby giving higher user rates more dynamically.

The present invention describes a non-centralized method and system for solving common channel and power allocation of a group of radio devices each performing the same method. The group of radio devices can also cooperate with centrally controlled systems. It can be used on a country/community scale and create an opportunity to launch new radio systems using all frequency bands even if they are currently occupied.

Using the method according to the invention enables coordination between primary and secondary system and coordination between devices in secondary systems is coordinated and solved by the radio devices in a same group.

SHORT DESCRIPTION OF THE INVENTION

The invention is defined by a method for channel and power allocation of wireless communication devices sharing a common frequency band, and where the devices are connected to a backhaul network, and where devices are discovered by software agent running on each device organized in a peer to peer fashion collecting information about surrounding devices, and where each device is using one of a limited number of channels, and where each device is configured to contribute in assisting the other devices in a group of devices in assigning the transmit power level and choosing the channel of each device for which the assignment influences the communication performance of all devices in the group.

The method is characterised in the further steps of using a gossip protocol to discover devices by communication over a backhaul network and using this information to exchange local information and information about other devices in the same group over the backhaul network without operator intervention or a shared device acting as local coordinator and where all devices in the group perform the same operations by solving the common channel and power allocation using the same software clients installed in all devices, and in this way helping each other in solving the allocation problem quicker.

Other features of the inventive method are defined by the dependent claims.

The invention is also defined by a device for performing said method, and a system comprising a plurality of such devices.

DETAILED DESCRIPTION OF THE INVENTION

The invention will now be explained in detail with reference to the drawings in which.

In the following description a wireless radio communication device is meant to be a device capable of communicating wirelessly with clients, e.g. laptops, tablets and mobiles. Devices are connected to a backhaul network, e.g. a router operating as an access point for other wireless clients.

When channels to be used by the access points are chosen by routers trying to optimize their own performance, there will be some links which get good performance and some which will be poor performance since they are located close together and there are not enough channels. In the 2.4 GHz ISM band there are only three channels which are not overlapping 1, 6 and 11. Since access points are not aware of the total picture of a neighbourhood, the selection of the channel must be done locally based upon what can be observed at an access point. This local algorithm will therefore almost never find the best frequency allocation.

A radio device operating as a clever Wi-Fi access point, also called a router, without knowledge about surrounding device topology will try to choose a channel with the least interference by Least Congested Channel Search (LCCS). The sequence in which networks are chosen is random and is not the result of a joint channel allocation. Since the correct sequence is essential in order to find the best solution, the result is often not optimal.

Figure 1A:
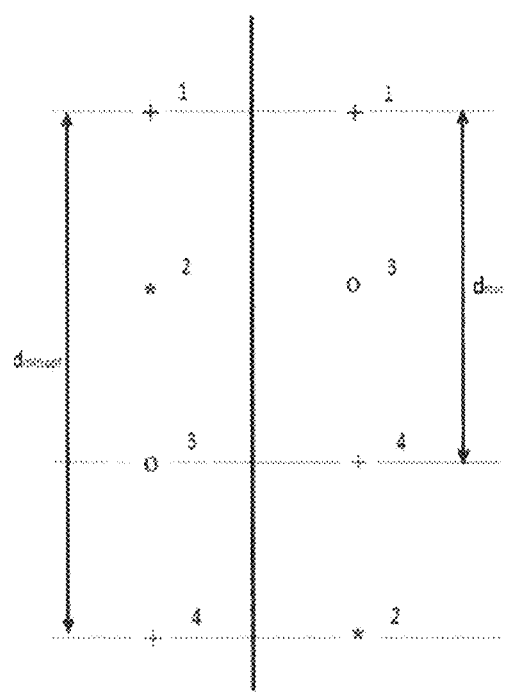
FIG. 1A is an example of a topology consisting of 4 devices located on a line.

FIG. 1A shows an example of a topology consisting of 4 devices located on a line. The symbols show the channels selected for each node and the numbers show the sequence in which they are selected. To the left a successful sequence (1,2,3,4) is chosen and to the right the Least Congested Channel Search algorithms (LCCS) is choosing devices randomly. This may result in a sub-optimum solution (1,4,2,3) with a smaller distance between devices with the same channel.

Figure 1B:
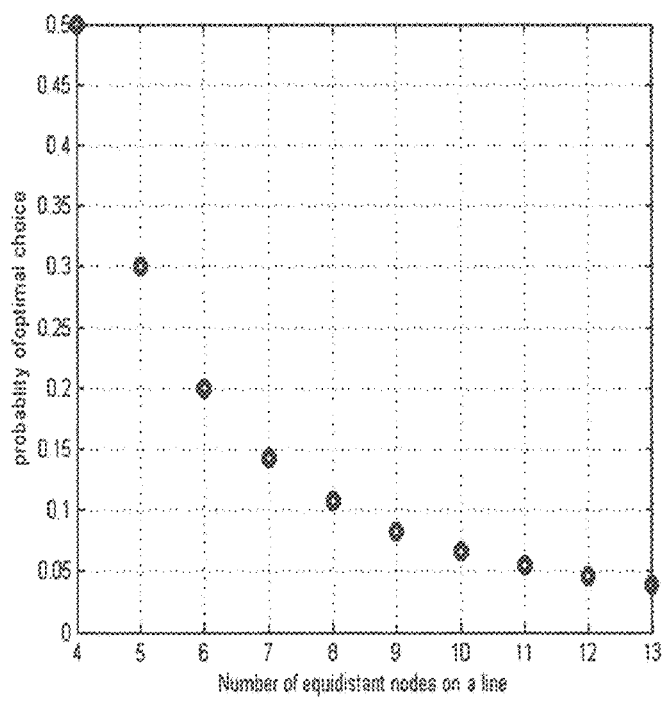
FIG. 1B illustrates the probability of optimal choice of a topology consisting of devices located on a line.

FIG. 1B shows that the probability of choosing an optimal sequence is 0.5 for this simple case, but will be smaller for an increasing number of devices, e.g. for 5 devices on a line it is 0.3.

In this simple example all the access points (devices) were located on a line disregarding the clients for simplicity or assuming them to be close to the access points. If the locations of the access points are random like that shown in FIG. 2A for 12 nodes, the distribution of distances is given in FIG. 2B when each access point selects the channel with least interference. The likelihood of choosing the best allocation is very small. The solution indicated with a circle is that found according to the method of the present invention, which is aware of the total topology by using peer-to-peer software agents running in the access points enabling a neighbour list to be exchanged.

Figure 2A:
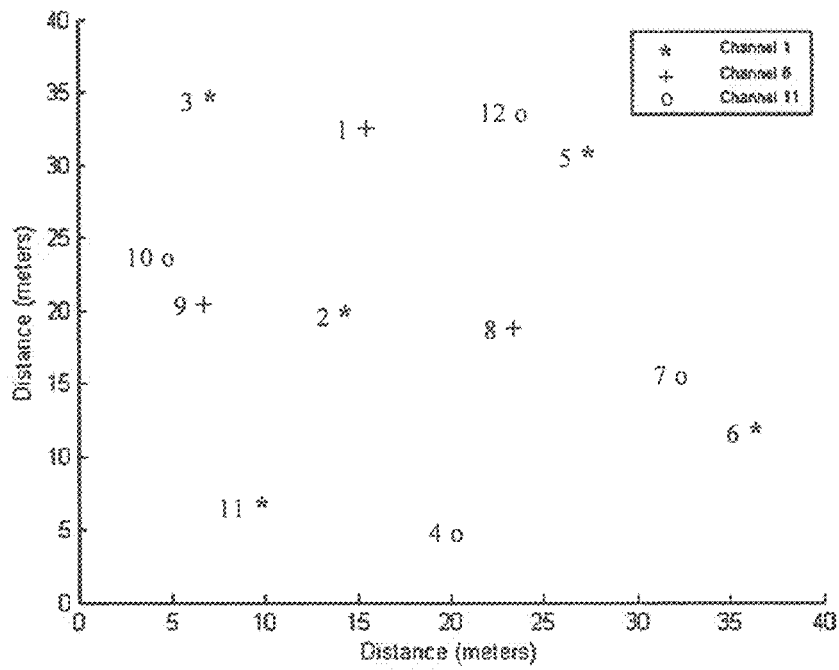
FIG. 2A illustrates sets of local devices close together in one group.

FIG. 2A shows 12 access points with random location. Both axes are marked in meter. Each channel is indicated with a symbol.

Figure 2B:
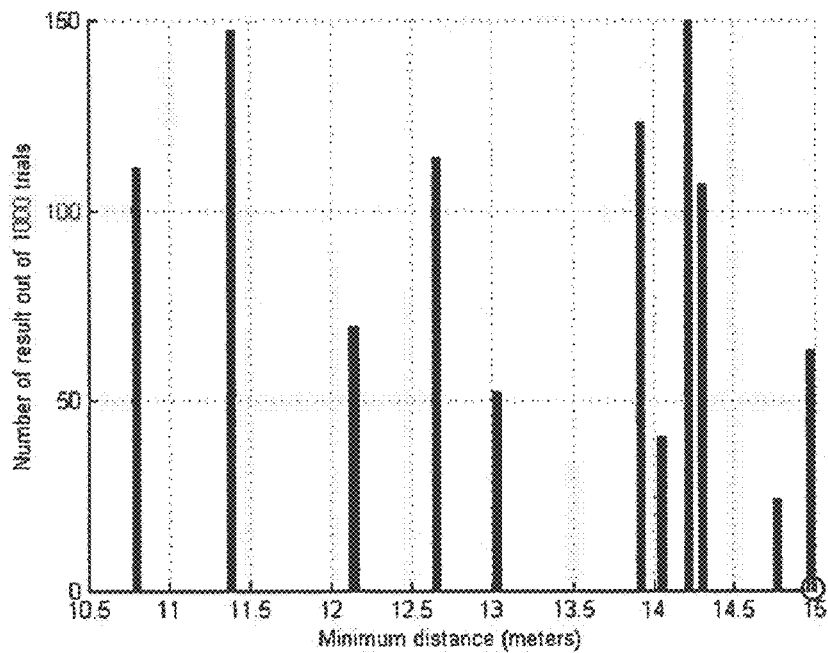
FIG. 2B illustrates the corresponding distance distribution when each access point in FIG. 2A continuously selects the channel with the least interference.

FIG. 2B shows the corresponding distance distribution when each access point continuously select the channel with the least interference in 1000 different trials. The Y-axis is number of results out of 1000 in total. The X-axis is in meters and show the smallest distance between two access points sharing the same channel out of 3 channels. The probability of not finding the optimum solution is 0.93 using the usual method of selecting the channel with least interference (LCCS) since the probability of finding the best solution is 0.07 which can be read from the figure. With other topologies, the probabilities are different.

Figure 3:
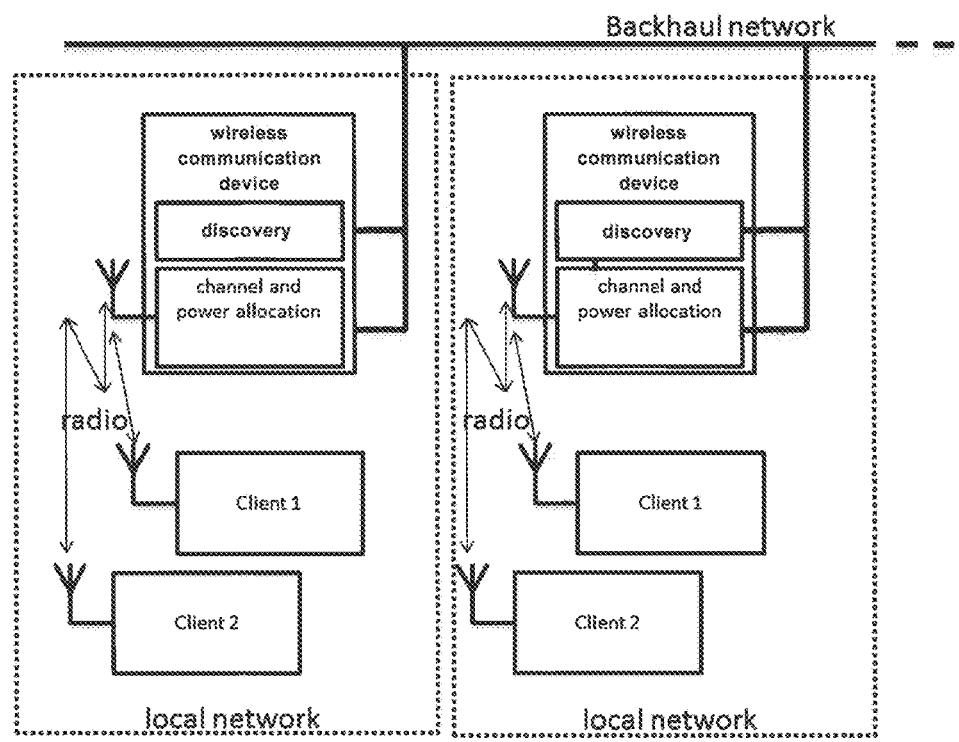
FIG. 3 shows an example of local devices with corresponding clients, called a local radio network.

FIG. 3 illustrates neighbouring local networks with corresponding clients communicating with Wi-Fi access points via radio. The access points are connected to a common backhaul network.

Normally each local radio network will set up and coordinate different network devices connected to the network, and doing so independently of any neighbouring network.

According to the present invention a better solution for setting up and optimising several neighbouring network is described.

The problem of calculating the best channel assignment is a computational demanding problem which is hard to solve quickly. The present invention therefore presents a method suited to be executed by microprocessors of Wi-Fi access points comprised in the network. This calculation is called joint channel and power allocation and is carried out with data from cooperating wireless communication devices included in a group. A group may comprise different devices such as for instance Wi-Fi access points, Bluetooth devices or gateways located in a local area for which coordination is needed due to their proximity to each other.

Figure 4:
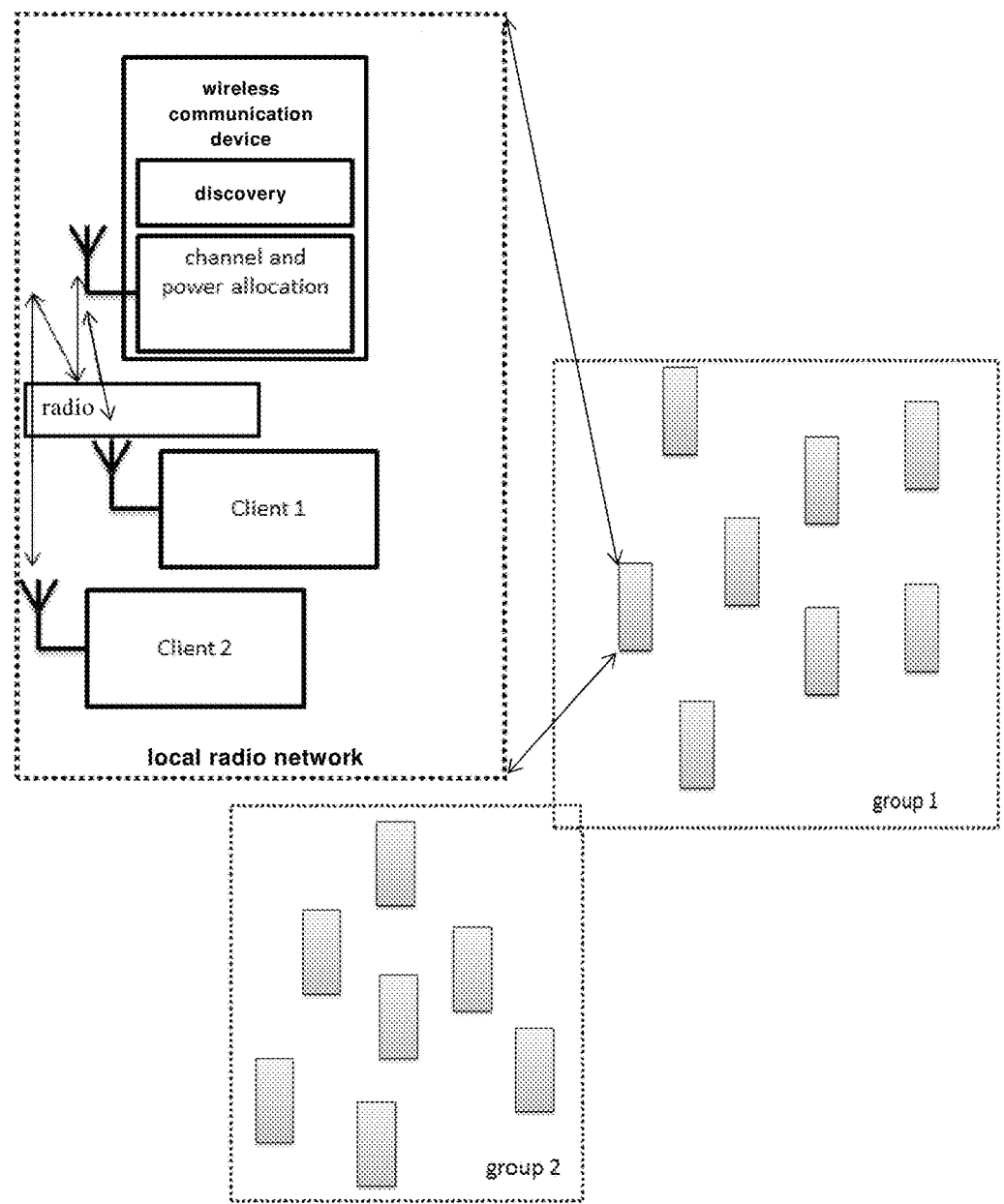
FIG. 4 illustrates sets of local devices organized in groups, because their radio parameter settings are interfering with each others resulting in reduced performance.

FIG. 4 illustrates sets of local networks close together in groups. Groups of wireless devices are defined according to the propagation range of the radio signals.

The invention is defined by a method for channel and power allocation of wireless communication devices sharing a common frequency band. The devices are connected to a backhaul network and each device is collecting information about surrounding devices known as a discovery module. Each device is using one of a limited number of channels, and each device is configured to contribute in assisting the other devices in a group of devices in assigning the transmit power level and choosing the channel of each device for which the assignment influences the communication performance of all devices in the group.

This is done by using a gossip protocol to discover devices by communication over a backhaul network and using this information to exchange local information and information about other devices in the same group over the backhaul network without operator intervention or a shared device acting as local coordinator and where all devices in the group perform the same operations by solving the common channel and power allocation using the same software clients installed in all devices, and in this way by helping each other to solve the allocation problem faster.

It is essential that the group of connected Wi-Fi access devices share the same information about the nodes in the network in order to cooperate. Therefore this information is passed over the backhaul network prior to performing channel and power allocation in a cooperative manner.

To ensure that all cooperating wireless communication devices share the same data, Bloom filters may be used.

In one embodiment, the method further comprises using a database for finding other wireless communication devices, like TV transmitters etc., using the backhaul network, in order to coordinate their operations for solving channel and power allocation task for the group.

In another embodiment, the method further comprising wireless devices operating on behalf of each other where the other device is chosen randomly, and where the identity of the two devices is shared only by the two devices to conceal the relationship between their locations and their IP addresses.

In one embodiment, the method further comprises including different requirements related to radio capacity of each wireless device in addition to the channel and power allocation, where this is implemented in software running on clients in all the devices in the same group.

In another embodiment, the method further comprises including the presence of local devices which are not cooperating in channel and power allocation tasks of the group by detecting their presence by radio measurements.

In one embodiment, the method further comprises using a conflict graph when solving the common channel and power allocation.

By slowly introducing empathic radios which do not disturb each other so much, more wireless capacity can be made available. This is done by the discovering module installed in all wireless devices, e.g. Wi-Fi router, connected to the Internet which share their presence and produce candidate node neighbour lists to each other. This list is used to identify groups of connected nodes, e.g. an apartment building, which needs to coordinate a frequency band, e.g. the 2.4 GHz ISM band.

By using the gossip protocol rather than broadcasting, the bandwidth consumption for discovering other users of a network is minimized.

Dynamic Spectrum Allocation for the ISM bands may be based on a central database. For Internet of Things, operation of this database requires an organization that is willing to fund and coordinate the database for all receivers and transmitters involved. For users of the ISM bands such an authority is not immediately identifiable. An alternative is a more organic method based on voluntary participation in a P2P network. This minimizes operator intervention to improve the system or respond to customer complaints concerning choice of channel and lack of radio link performance.

The issue of centralized and decentralized is not only a technical issue; it is also a political one concerning the control over frequency resources. In the US, the FCC has proposed using a database for discovering available frequencies. The database will comprise information of areas where it is safe to use radio transmission in part of the white space TV frequencies. The system is dimensioned to take care of the TV viewers without knowing their location by making worst case assumptions. How the database is to be accessed is about to be defined by the Protocol to Access White Space database. However, this system is currently not designed to allow fine grained discovery. A disadvantage with a centralized scheme is that it requires an organization willing to take responsibility and the cost associated with establishing and maintaining the infrastructure.

For some frequency bands, the owner of the frequencies is an obvious candidate. In other bands, such as the open ISM band, there may be no clear candidates for taking this responsibility. An alternative design option is a fully decentralized system similar to existing P2P solutions. They can grow organically as the user numbers and requirements increase. As long as there are Wi-Fi users with the same interest, it will function. There is no need for a large initial investment or maintenance. Each user carries their own cost and the community ensures development and maintenance of the software and system.

A P2P network could use existing network connections to build an overlay over the Internet and then use it to discover and negotiate other radio devices in their area using the backhaul network for the control messages. This requires a connection to the Internet, which is also a requirement in a centralized solution. As long as it can run directly on the radio device, the system would not require additional investment in infrastructure or central servers. The decentralized solution may be gradually deployed and coexist with legacy systems and the performance would increase as more devices uses it. A decentralized protocol may even be used in addition to central databases, e.g., by being used as a fall-back mechanism in areas that are not covered by other solutions or to discover databases that are responsible for frequency allocation in a given area.

Mobile phone systems operate in dedicated bands assigned to users in which they are the primary users and must not be disturbed by other (secondary) users. These systems are carefully designed to operate by selecting the sites for the base stations and giving the transmit power and an operating band in a process called radio planning in order to optimize the network performance and avoid mutual interference in the system. In the ISM band in the US, there are so called white space operators who assign bands in TV bands for secondary users where the TV systems are the primary users. These systems do however not optimize the joint performance of the secondary users.

The present invention provides a method for solving the common channel and power allocation of wireless communication devices sharing a common frequency band, and doing this faster with better performance than prior known methods by using the same software clients installed in all devices for exchanging information about other devices via the backhaul network.

By letting all Wi-Fi access points execute identical protocols in their clients, a smart channel allocation is established, where disturbance between different networks is minimized and the allocation problem is solved faster.

Once the members of the group have been identified based on radio proximity measurements, the devices in the group share a set of parameters of the group members from which a common upper and lower bound can be calculated and the derived power and channel assignment is known to be the highest possible performance metric value within these bounds. Therefore, each device in the group selects a value at random which is between these bounds and tries if a solution can be found. If it fails, the upper bound is reduced and if it succeeds, the lower bounds is increased continuously informing the other group members about the current bounds until all devices share the same and best solution for the group.

The system according to the invention requires no organization to run as it can grow organically as the number of user's increases. There is no need for a large initial investment or maintenance. Each user carries their own cost and the community ensures development and maintenance of the software and hardware. This is just how systems in the ISM band operate today.

The invention claimed is:

1. A method for channel and power allocation of wireless communication devices sharing a common frequency band, and where the devices are connected to a backhaul network, and where devices are discovered by software agents running on each device collecting information about surrounding devices, and where each device is using one of a limited number of channels, and where each device is configured to contribute in assisting the other devices in a group of devices in assigning the transmit power level and choosing the channel of each device for which the assignment influences the communication performance of all devices in the group, comprising:

using a protocol to discover devices by communication over the backhaul network and using this information to exchange local information and information about other devices in the same group over the backhaul network without operator intervention or a shared device acting as local coordinator, and where all devices in the group perform the same operations for channel and power allocation using the same software installed in all devices, and in this way helping each other in solving the allocation problem quicker, and where the devices in the group is assigned based on radio proximity measurements, and therefore share the same set of parameters of the group members from which a common upper and lower bound can be calculated and from which desired power and channel assignment are determined to be the highest possible performance metric value within these bounds, and each device in the group selects a value at random which is between these bounds and tries if a solution can be found, and if a solution is found, the lower bound is increased, and if it fails, the upper bound is reduced, and where the other devices in the group is continuously informed about the current bounds until all devices share the best solution for the group.

2. The method according to claim 1, further comprising using a conflict graph for channel and power allocation.

3. The method according to claim 1, further comprising using a database for finding wireless communication devices influencing the groups radio performance using the backhaul network, in order to coordinate their operations for solving channel and power allocation task for the group.

4. The method according to claim 1, further comprising to discover the devices by using the position of the devices obtained from the wireless clients connected to it.

5. The method according to claim 1, further comprising wireless devices operating on behalf of each other where the other device is chosen randomly, and where the identity of two devices is shared only by the two devices to conceal the relationship between their locations and their IP addresses.

6. The method according to claim 1, further comprising including different requirements related to need for radio capacity of each wireless device into a channel and power allocation algorithm implemented in software and in all the devices in the same group.

7. The method according to claim 1, further comprising including the presence of local devices which are not cooperating in channel and power allocation tasks of the group by detecting their presence by radio measurements.

8. The method according to claim 1, further comprising using Bloom filters for ensuring that the cooperating devices in the group share exactly the same parameters.

9. A wireless communication device arranged for sharing a common frequency band and for allowing channel and power allocation among a plurality of similar surrounding devices, and where the device is connected to a backhaul network, and where the device is running software agents collecting information about surrounding devices, and where each surrounding device is using one of a limited number of channels, and where the device is configured to contribute in assisting other devices in a group of devices in assigning the transmit power level and choosing the channel of each device for which the assignment influences the communication performance of all devices in the group, comprising:

a processor executing a protocol for discovering devices by communication over the backhaul network and using this information to exchange local information and information about other devices in the same group over the backhaul network without operator intervention or a shared device acting as local coordinator, and where all devices in the group perform the same operations for channel and power allocation using the same software installed in all devices, and in this way helping each other in solving the allocation problem quicker and where the devices in the group is assigned based on radio proximity measurements, and therefore share the same set of parameters of the group members from which a common upper and lower bound can be calculated and from which desired power and channel assignment are determined to be the highest possible performance metric value within these bounds, and each device in the group selects a value at random which is between these bounds and tries if a solution can be found, and if a solution is found, the lower bound is increased, and if it fails, the upper bound is reduced, and where the other devices in the group is continuously informed about the current bounds until all devices share the best solution for the group.

10. A wireless communication system comprising a plurality of devices according to claim 9.

11. The wireless communication device according to claim 9, further comprising using a conflict graph when solving the common channel and power allocation.

12. The wireless communication device according to claim 9, further comprising using a database for finding wireless communication devices influencing the groups radio performance using the backhaul network, in order to coordinate their operations for solving channel and power allocation task for the group.

13. The wireless communication device according to claim 9, further comprising to discover the devices by using the position of the devices obtained from the wireless clients connected to it.

14. The wireless communication device according to claim 9, further comprising wireless devices operating on behalf of each other where the other device is chosen randomly, and where the identity of two devices is shared only by the two devices to conceal the relationship between their locations and their IP addresses.

15. The wireless communication device according to claim 9, further comprising including different requirements related to need for radio capacity of each wireless device into a channel and power allocation algorithm implemented in software and in all the devices in the same group.

16. The wireless communication device according to claim 9, further comprising including the presence of local devices which are not cooperating in channel and power allocation tasks of the group by detecting their presence by radio measurements.

17. The wireless communication device according to claim 9, further comprising using Bloom filters for ensuring that the cooperating devices in the group share exactly the same parameters.

* * * * *